Nov. 25, 1924.

F. H. OBERSCHMIDT 1,516,782

CORN POPPER

Filed Jan. 17, 1924      2 Sheets-Sheet 1

INVENTOR:
FREDERICK H. OBERSCHMIDT.
BY
Frank L. Sessions
ATTORNEY.

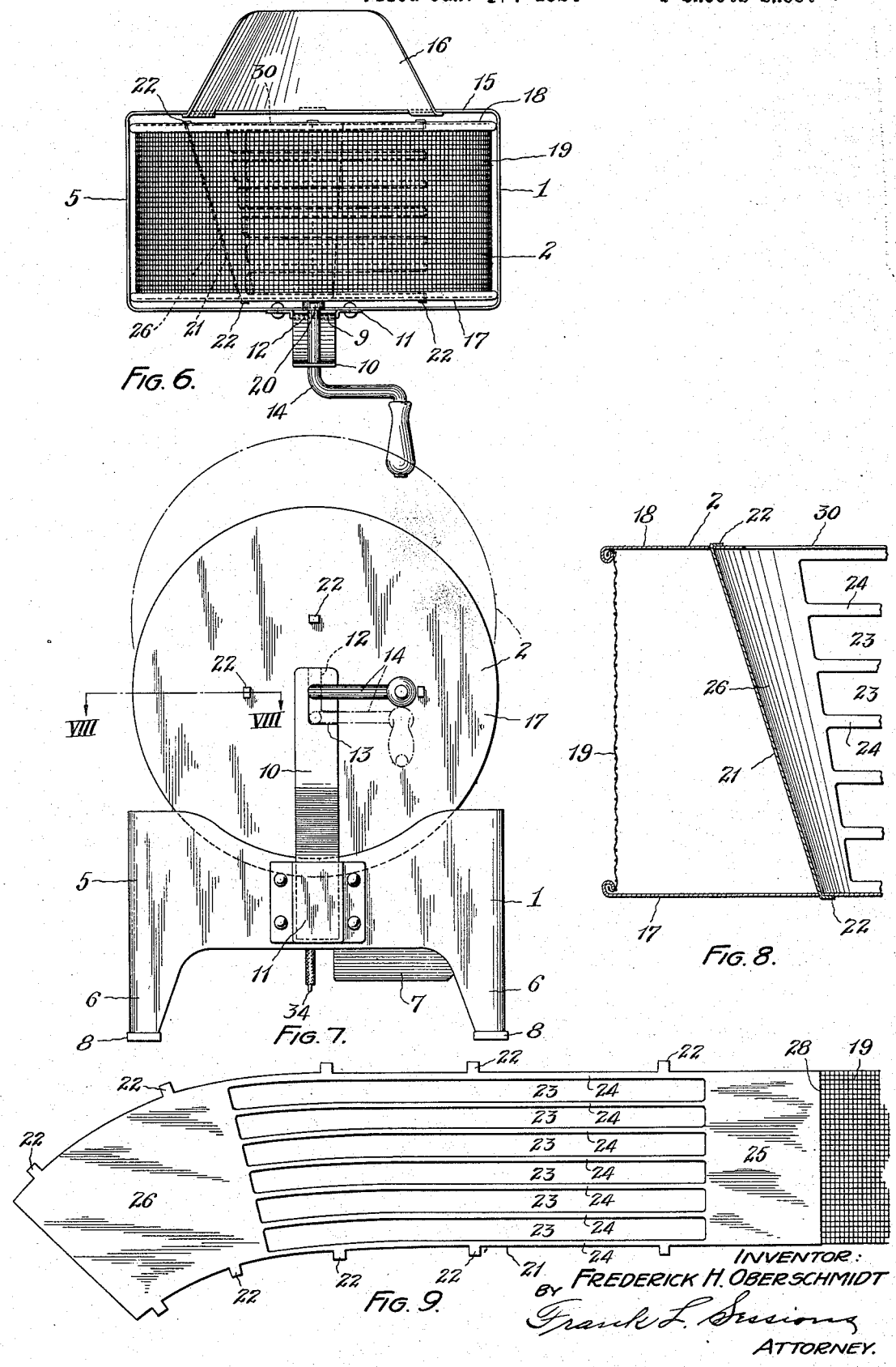

Patented Nov. 25, 1924.

1,516,782

UNITED STATES PATENT OFFICE.

FREDERICK H. OBERSCHMIDT, OF EAST CLEVELAND, OHIO.

CORN POPPER.

Application filed January 17, 1924. Serial No. 686,824.

*To all whom it may concern:*

Be it known that I, FREDERICK H. OBERSCHMIDT, a citizen of the United States, residing at East Cleveland, in the county of Cuyahoga and State of Ohio, have invented certain new and useful Improvements in Corn Poppers, of which the following is a specification.

My invention relates to that class of corn-poppers in which the unpopped corn is placed in a revoluble drum or cage which is then revolved in proximity to a suitable heating means, the unpopped corn being continuously agitated by the revolution of the drum, and the popped corn being separated from the unpopped corn by a screen which forms part of the drum structure.

The principal object of my invention is to provide an improved rotary corn-popper, adapted to household use, and of such efficiency and compact form that it can be used upon the dining room table or sideboard, or in the living room for the preparation of freshly popped corn at the moment it is desired. Other objects of my invention are: to provide a portable corn-popper embodying a heating element so that it does not require a stove or other separate source of heat for its operation; to provide a corn-popper of improved construction that can be used without danger of igniting surrounding materials, or the support upon which it is placed; to provide a corn-popper which can be readily charged with unpopped corn and which will automatically deliver the popped corn into a conveniently placed receptacle; to provide a corn-popper which can be readily emptied of its contents when desired; to provide a corn-popper in which the revoluble drum is a unitary structure which can be readily and quickly removed from its support and away from the heating element; to provide a corn-popper of such construction that the revoluble drum can be removed from and replaced upon its support without the use of any tools or special attachments; to provide a corn-popper which can be readily cleaned; to provide an improved form of screen for separating the popped from the unpopped corn; and to provide a corn-popper in which the revoluble drum is supported at one end only upon the stationary supporting frame, the other end of the revoluble drum being provided with a discharge opening which at no point in its revolution is obstructed by any part of the supporting frame.

The foregoing and other objects are accomplished by the use of my invention, a preferred embodiment of which is described herein and shown on the accompanying drawings in which:—

Fig. 6 is a top plan view of my invention;

Fig. 7 is an end elevation of my invention looking at the drum support and operating crank;

Fig. 8 is a section drawn to an enlarged scale on line VIII—VIII of Fig. 7; and

Fig. 9 is a development of the popped corn screen and discharge chute.

Figures 1, 2:
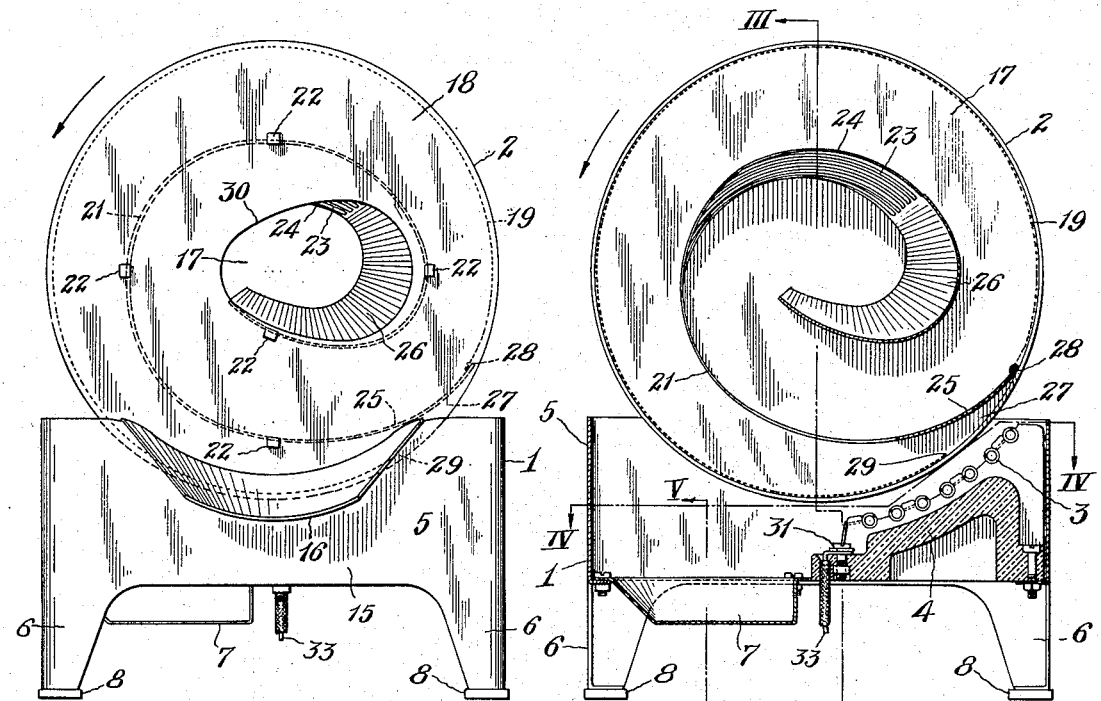
Fig. 1 is an elevation of my invention looking at the discharge end.
Fig. 2 is a section on line II—II of Fig. 3.

Referring to the drawings, 1 is the stationary element and 2 is the revoluble drum. The stationary element, 1, comprises preferably a sheet-metal base, adapted to carry the heating element such as the electric heating element, 3, which is incorporated in, or carried by a refractory, insulating support, 4, and suitable bearing supports for the shaft of the revoluble drum, 2. The stationary element preferably is made of pressed-metal, the body portion, 5, of which is provided with legs, 6, which support the body portion, 5, and the heating element, 3, sufficiently above the table or other support upon which the corn-popper may be placed, to prevent the heat of the heating element from igniting or scorching it.

The body, 5, of the stationary element is preferably made of hollow, open-top, box form, so that it will catch any dust that may be shaken from the corn, especially any particles that may be ignited by the heating element. The heating element, 3, preferably is disposed below the drum, 2, on one side of the vertical plane of the axis of the drum. On the other side of this central, longitudinal vertical plane the bottom of body, 5, may have an opening and a chute, 7, may be provided for receiving and discharging into a receptacle the contents of the revoluble drum when it is desired to completely empty it, which may be done by rotating it backwards as will be described.

Pads, 8, of soft rubber or other non-scratching, heat-insulating material may be secured to the bottom of the legs, 6, to prevent scratching of the table or other support and also to prevent the transmission of undue heat thereto, by the legs, 6.

To one end of the body, 5, of the stationary element, 1, there are secured, preferably detachably, the upwardly extending bearing standards of supports, 9 and 10, for the revoluble drum. The supporting members, 9 and 10, preferably are made of flat, sheet-metal strips, detachably held in a pocket formed between the side of the body, 5, and a metal stamping or cover plate, 11, secured thereto.

The members 9 and 10, are secured together at their lower ends but are spaced apart at their upper ends, the inner one, 9, being provided with a vertical open-top slot, 12, while the outer member, 10, is provided with an L-shaped or bayonet joint slot, 13, open at one side but closed at its top. The drum, 2, is provided with a shaft, 14, which, in the preferred form of my invention shown, is bent in the form of a crank as seen in Fig. 6. The shaft, 14, is revolubly seated in the slots in the support, 9 and 10. The front end, 15, of the body, 5, is preferably cut away at the top, and an apron, 16, may be provided below the cutaway portion to catch the popped corn which falls from the rotating drum and guide it into a suitable receptacle.

Figure 3:
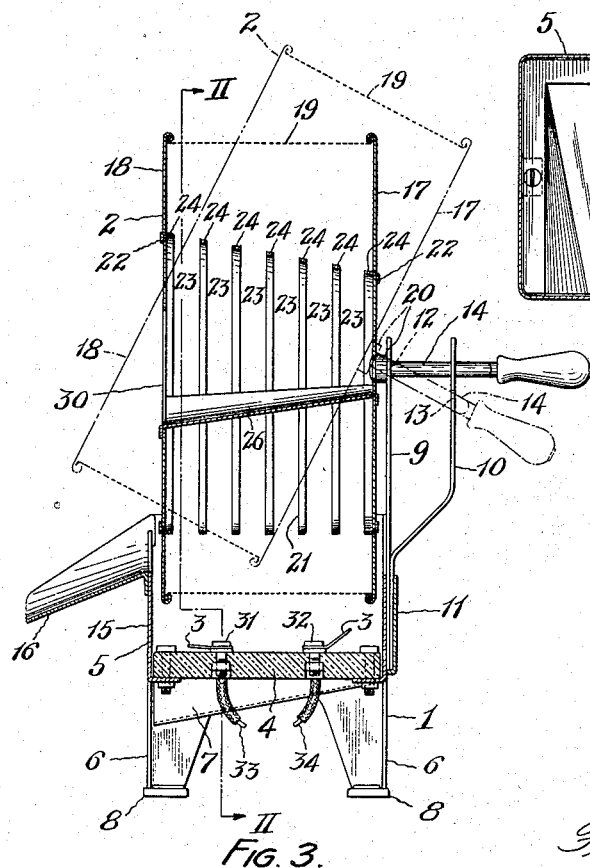
Fig. 3 is a section on line III—III of Fig. 2.
Figure 4:
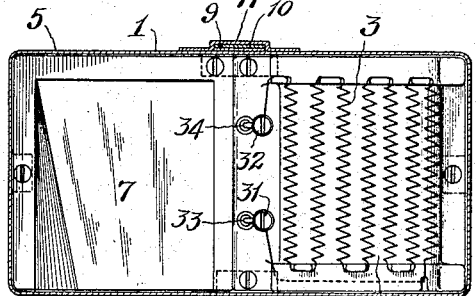
Fig. 4 is a section on line IV—IV of Fig. 2.
Figure 5:
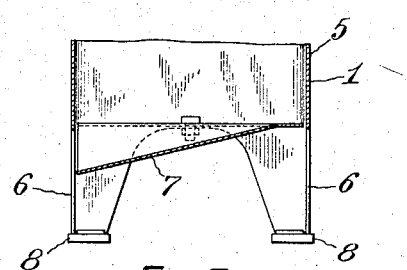
Fig. 5 is a section on line V—V of Fig. 2.

The body member, 5, preferably is made large enough so that the drum, 2, may be inserted into it by placing the shaft, 14, in the open-top slot, 12, of the supporting member, 9, and tipping the drum as shown by the dotted outline in Fig. 3, so that the shaft, 14, may enter the L-shaped slot, 13, after which the drum may be tipped into the vertical, operating position as shown in full lines in Figs. 3 and 7. This construction requires no tools of any sort for putting together or taking apart, and it facilitates cleaning the corn-popper. It also permits the corn-popper to be packed advantageously and safely in a small carton.

The drum, 2, is preferably made of two sheet-metal end plates, 17, 18, and a perforated or wire-mesh cylindrical side portion or shell, 19, secured to the end plates by interfolding their edges or other manner. The shaft, 14, may be provided with an enlarged collar, 20, and may be secured detachably or non-detachably to the end plate, 17, by any convenient means for supporting and rotating the drum.

The end plate, 18, has an opening, 30, near its center, out of which the popped corn is discharged while the drum is rotating. This opening is at the end of the drum opposite the crank-shaft, 14, and is entirely unobstructed.

It will be seen that the drum is revolubly and detachably supported upon the stationary element above the heating element and is supported in overhanging relation to its supports so as to leave the discharge opening unobstructed.

Within the drum, 2, is secured a spiral screen member, 21, for the popped corn. Member, 21, is preferably formed out of stamped sheet-metal, provided with lateral tangs, 22, adapted to be inserted through small, slot-like apertures in the end plates, 17 and 18, and to be secured by bending them over in well known manner. The screen portion of the member, 21, preferably has alternate slots, 23, and bars, 24, the slots being wide enough to permit the unpopped corn but not the popped corn to fall through them. The ends of the screen, 21, preferably are left unslotted and imperforate to provide an apron, 25, over the clean-out opening, 27; and to provide a conical discharge chute, 26, at the inner end of the screen for discharging the popped corn through the opening, 30, in end plate, 18.

The screen portion of member, 21, is cylindrical and the chute portion, 26, is conical to provide respectively for the separation and for the discharge of the popped corn. A development of member, 21, is shown in Fig. 9.

The side or shell portion, 19, of the drum preferably falls short of being a complete circle and its ends are spaced apart to provide a circumferential, clean-out opening, 27, bounded by the end plates, 17 and 18, and the ends, 22 and 29, of the member, 19. It will be seen in Figs. 1, 2 and 9, that the end, 25, of member, 21, connects with the end, 28, of the side portion, 19, of the drum 2.

Clean-out opening, 27, is provided for the purpose of emptying the drum, 2, of its entire contents, by rotating it backwards. When popping corn, the drum is normally rotated in the direction shown by the arrows in Figs. 1 and 2, and when so rotated the imperforate portion, 25, of the screen member, 21, carries the contents of the drum over the clean-out opening, 27, so that the unpopped corn which falls through the screen will fall upon the inner surface of the shell, 19, at the other side of the clean-out opening, 27. It will be observed that if the drum be rotated in the reverse direction, its entire contents will travel around the drum in the reverse direction from that followed when the drum is rotating normally, and will be discharged eventually through opening, 27, into the hollow body, 5, and chute, 7.

The surface of the conical chute portion, 26, of the screen, 21, is so inclined that the popped corn which is picked up by the screen, 21, and conveyed thereby towards the center of the drum will be discharged through the opening, 30, into the receptacle which may be placed to receive it. Any unpopped corn that may arrive at the end, 25, of the screen, 21, will fall through the slots, 23, into the drum, and again be subjected to the heating action of the heating element, 3, so long as the drum, 2, is rotated in the corn-popping direction.

The support, 4, of the heating element, 3, is preferably made of porcelain, and it may have suitable perforations to receive the binding posts, 31 and 32, for the electrical conductors, 33 and 34, which convey current to the heating element.

The operation of my invention is as follows: The unpopped corn may be put into the drum, 2, through either of the openings, 27 or 30. The drum being mounted upon its supports and the heating element being energized, the drum containing a quantity of unpopped corn is continuously rotated at such a speed that the unpopped corn is carried up the ascending side of the drum over the inclined heating element. When the corn has been carried to a certain height the inclination of the side of the drum causes the corn to roll down towards the bottom of the drum and it thus travels around the drum in a direction relatively opposite to the rotation of the drum. Both the popped and unpopped corn are thus made to progress around the inner surface of the drum until they arrive at the screen, 21, through which the corn which remains unpopped falls upon the shell, 19, while the popped corn which is too large to pass through the slots, 23, passes over the screen and is discharged through opening 30, by chute, 26.

It will be observed that my invention accomplishes the above stated objects; that it is susceptible to ornamental design; is small and compact for household use; and that it may be manufactured at low cost.

I claim:—

1. In a corn-popper, a stationary element, a heating element carried by said stationary element, a single revoluble drum supported at one end only, and tiltable relatively to the stationary element and heating element, supporting means carried by said stationary element, and a shaft secured to said drum extending outwardly from one end thereof and revolubly and detachably mounted on said supporting means.

2. In a corn-popper, a stationary element, a heating element carried by said stationary element, a single revoluble drum supported at one end only and tiltable relatively to the stationary element and heating element, supporting means for said drum carried by said stationary element, and a shaft secured to said drum extending outwardly from one end thereof revolubly and detachably mounted in bearings in said supporting means to support said drum in overhanging relation to said bearings.

3. In a corn-popper, a revoluble element comprising a drum having a shell, the ends of the shell being spaced apart to form a clean-out opening, and a screen member connecting with one end of said shell and extending spirally inwardly therefrom towards the center of said drum and terminating at its inner end in a conical portion, a portion of said screen member intermediate its ends being slotted longitudinally to permit unpopped corn to fall therethrough.

4. In a corn-popper, a revoluble element comprising a drum having a cylindrical shell the ends of the shell being spaced-apart to form a clean-out opening, and a screen member connecting with one end of said shell and extending spirally inwardly therefrom in the form of a cylinder towards the center of said drum and terminating at its inner end in a conical portion, said screen member having imperforate end portions and its intermediate portion being slotted longitudinally with a plurality of slots alternating with longitudinal screen bars.

5. In a corn-popper, a revoluble element comprising a drum having end plates and a shell, the ends of the shell being spaced apart to form a clean-out opening, and a screen member connecting with one end of said shell and extending spirally inwardly therefrom towards the center of said drum and terminating at its inner end in a conical portion, said end plates having slots and said screen member having laterally extending tangs extending through said slots and bent over to secure said screen and said plates together.

6. In a corn-popper, a stationary element, a heating element carried by said stationary element, a single revoluble drum supported and one end only and tiltable relatively to the stationary element and heating element and having a discharge opening at one end, a shaft secured to said drum and extending outwardly from the other end thereof, and a support for said drum adapted to receive said shaft and support said drum in overhanging relation to said support.

7. In a corn-popper, a supporting base, a single revoluble drum supported at one end only mounted on said base, and tiltable relatively to the face, a heating element mounted on said base below said drum at one side of the vertical plane of the axis of said drum, said heating element extending upwardly adjacent to the surface of said drum in the direction of movement of said surface when the drum is being rotated to pop corn.

8. In a corn-popper, a hollow supporting base, a single revoluble drum supported at one end only mounted on said base and tiltable relatively to the base, and a heating element mounted on said base below said drum at one side of the vertical plane of the axis of said drum, said base having an opening below said drum at the other side of said plane, said drum having a discharge opening for popped corn in one end and a clean-out opening in its shell.

9. In a corn-popper, a stationary element comprising a base, a pair of bearing standards extending upward from one end of said base, said bearing standards being spaced apart at their upper ends the one nearer to the base having an open-top slot and the other an L-shaped open-sided, closed-top slot, and a heating element carried by said base located on one side of a vertical axial plane; and a single revoluble drum having a shaft secured to one end thereof revolubly and detachably mounted in said slots, said drum being thereby disposed above said heating element in overhanging relation to said bearing standards.

10. In a corn-popper, a stationary element comprising a base, a drum support at one end only of said base, said support comprising a bearing consisting of a vertical slot and a cooperating bayonet slot, a heating element carried by said base; and a tiltable drum supported at one end only having a shaft revolubly and detachably mounted in said support.

11. In a corn-popper, a stationary element comprising a base, a drum support at one end of said base, and a heating element carried by said base; and a revoluble drum comprising two end plates and a shell, one of said end plates having a discharge opening for popped corn, said shell having its ends spaced apart to form a circumferential, clean-out opening, a screen member connecting with one end of said shell, and extending spirally inwardly therefrom and terminating at its inner end in a conical portion, one end of said conical portion being presented to said discharge opening and the sides of said conical portion being inclined towards said discharge opening, and a shaft secured to said drum, said shaft being revolubly mounted in said drum support whereby said drum is supported above said heating element in overhanging relation to said drum support.

FREDERICK H. OBERSCHMIDT.